Figure 1:
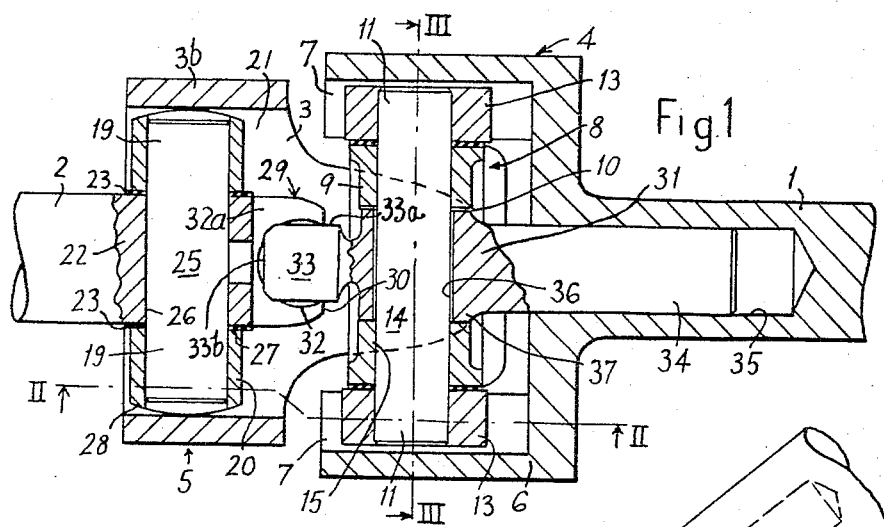

Feb. 28, 1967 — S. P. V. PIATTI — 3,306,077

UNIVERSAL JOINTS

Filed Feb. 19, 1965 — 2 Sheets-Sheet 1

Inventor
S. P. V. Piatti
By
Attorneys

Feb. 28, 1967  S. P. V. PIATTI  3,306,077
UNIVERSAL JOINTS

Filed Feb. 19, 1965  2 Sheets-Sheet 2

Inventor
S. P. V. Piatti
By
Attorney

United States Patent Office 3,306,077
Patented Feb. 28, 1967

3,306,077
UNIVERSAL JOINTS
Sanzio Pio Vincenzo Piatti, 14 Carso Porta Nuova,
Milan, Italy
Filed Feb. 19, 1965, Ser. No. 433,901
Claims priority, application Italy, Mar. 10, 1964,
5,788/64
9 Claims. (Cl. 64—21)

The present invention relates to universal joints of the double Cardan type, wherein at least one of the Cardan joints comprises a cross member of which the two pairs of trunnions couple an input or output fork to a central coupling element which connects the two Cardan joints together, and wherein the input and output members of the double joint are also coupled together by a ball and socket joint between the ends of axial extensions from the adjacent ends of the input and output members.

In a truly constant velocity universal joint of this type, for example, as described in the specification of my United States Patent Serial No. 219,889, filed August 28, 1962 now Patent No. 3,177,685, at least one of the Cardan joints is slidable with respect to the central coupling element and the distances between the centre of the ball and socket joint and the axes about which the input and output members rock relative to the central coupling element are maintained equal, whereas in an approximately constant velocity joint the input and output members are pivoted at fixed positions on the central coupling element and one of the axial extensions, or the ball and socket joint, has to be variable in length to enable the input and output members to rock with respect to the central coupling element. In the latter joint, truly constant velocity transmission is only achieved in one position of the input and output members, that is, when these members are in such a position that the distances between the centre of the ball and the axes about which the members rock relative to the central coupling element are equal.

The axial extension within the fork of the said at least one Cardan joint comprising a cross member projects through an opening in the centre of the cross and, as can be seen, for example, from the drawings of the aforementioned application, has a considerable unsupported length. The axial extension can therefore readily flex and this affects the operation of the universal joint.

According to the present invention, the axial extension within the fork of said at least one Cardan joint is supported intermediate its ends in an opening in the centre of the cross by means which allows the cross to rock relative to said extension about the axis of the trunnions which are pivoted to said fork. The axial extension is thereby supported against flexing. Moreover, a universal joint embodying the invention has the advantage over hitherto known joints of this type that, in order to position the ball or socket correctly, it is only necessary accurately to determine one dimension, that is, the distance between the centre of the ball or socket and the axis about which the cross rocks relative to the associated axial extension.

The pair of trunnions pivoting the cross of said at least one Cardan joint to the input or output fork may also be slidably mounted in the fork so as to enable the cross to move relative to the associated input or output member in the direction of its axis of rotation and the axial extension supported by the cross may have an end portion remote from the ball and socket joint slidable in an axially extending passageway in the associated input or output member. With this arrangement, variations in the length of a transmission system including the universal joint can be compensated for by the joint itself, without the necessity of providing additional sliding, splined couplings in the system, as have hitherto been required.

Figure 2:
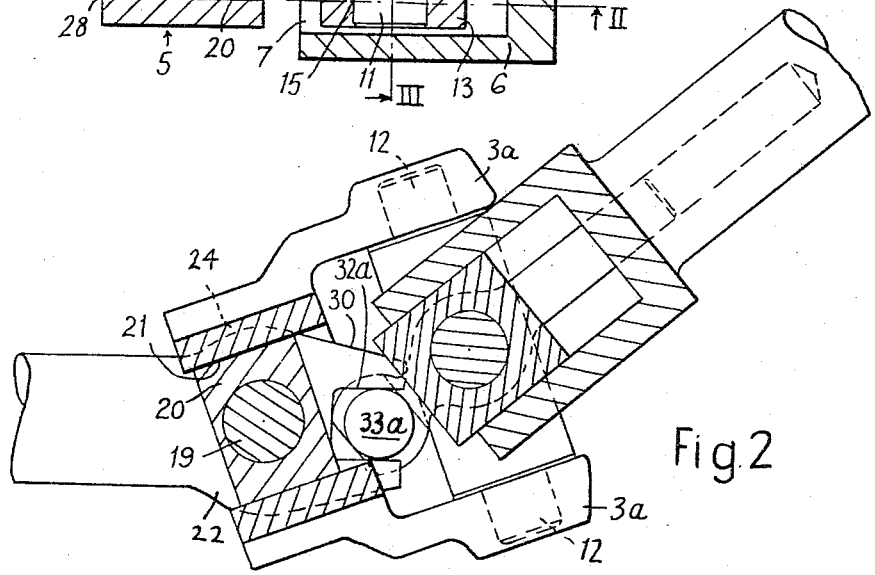
Figure 3:
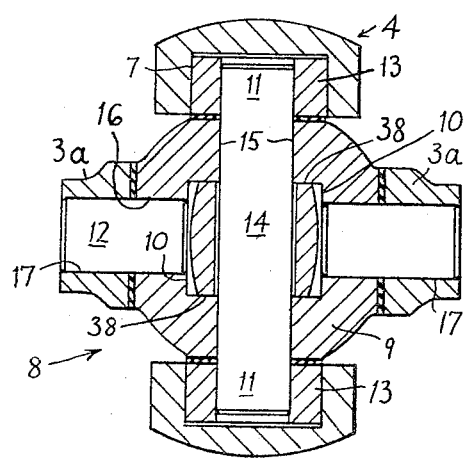
Figure 4:
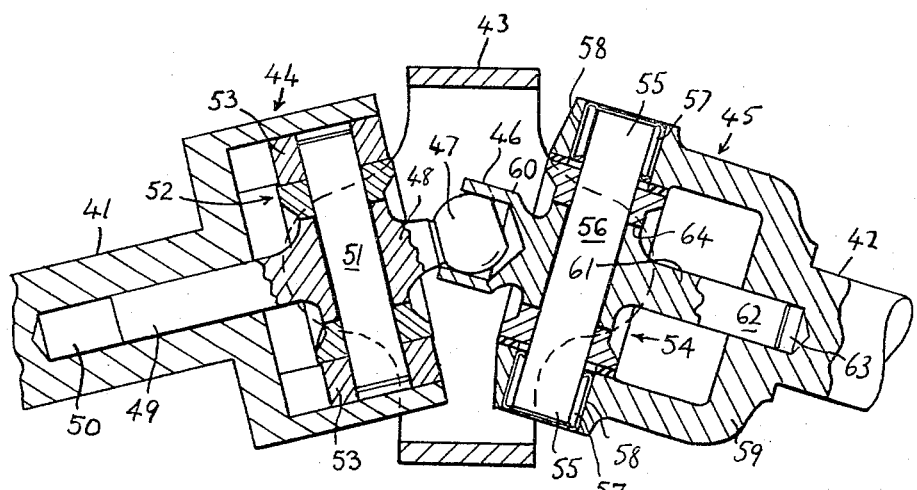
Figure 5:
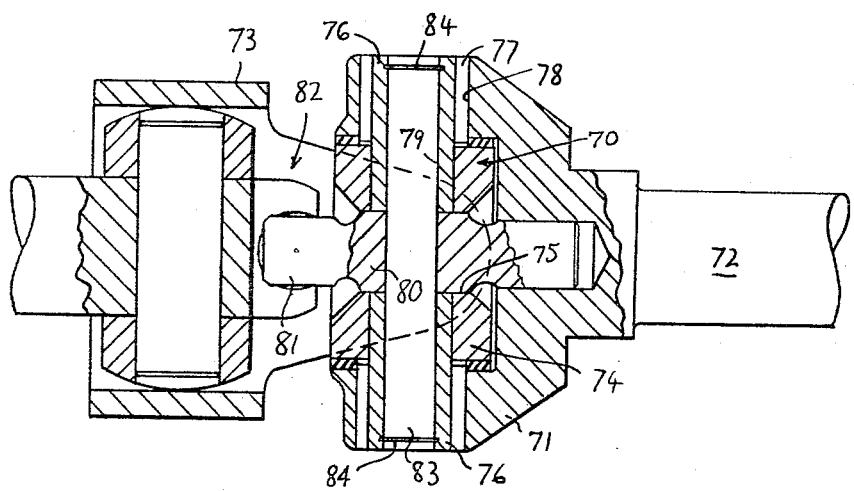

In order that the present invention may be more readily understood, reference will now be made to the accompanying drawings, in which:

FIGURE 1 is a longitudinal section through a constant velocity universal joint embodying the invention, FIGURE 2 is a section on the line II—II of FIGURE 1, FIGURE 3 is a section on the line III—III of FIGURE 1, FIGURE 4 is a longitudinal section through an approximately constant velocity universal joint embodying the invention, and FIGURE 5 is a longitudinal section through another form of constant velocity universal joint embodying the invention and particularly illustrates a modified construction of the cross supporting the axial extension.

Referring to the drawings, the constant velocity universal joint shown in FIGURES 1, 2 and 3 is of the type described in my aforementioned application and comprises rotatable input and output shafts 1, 2 coupled to a central coupling element 3 by two Cardan joints, generally indicated at 4 and 5. The joint 4 includes an input fork 6 at the end of the input shaft 1 and formed with opposed guideways 7 extending parallel to the axis of this shaft, and a cross member 8 which couples the fork to the central coupling element 3. The cross 8 comprises a hub 9 provided with a central opening 10 and carrying two pairs of trunnions 11, 12 having their axes arranged at right angles to one another. The trunnions 11 are pivoted in bearers 13, which consist of rectangular blocks, slidably engaged in the guideways 7 and they are formed by the projecting portions of a single pin 14 which extends across the opening 10 and is secured in aligned apertures 15 in the hub on opposite sides of the opening. The trunnions 12, which consist of separate pins secured in apertures 16 in the hub 9, are pivoted respectively in aligned bearing apertures 17 formed in spaced arms 3a of the central coupling element 3.

The Cardan joint 5 coupling the shaft 2 to the central coupling element 3 comprises a pair of trunnions 19 projecting from the shaft 2 and pivoted in bearers 20 which are slidable in opposed guideways 21 in the pot portion 3b of the central coupling element. The guideways 21 extend longitudinally of the coupling element 3 and are so arranged that the axis of the trunnions 19 lies in the same place as the axis of the trunnions 11. At its end adjacent the coupling element 3, the shaft 2 has a part-spherically-shaped boss portion 22 which has opposite flat faces 23 and is freely received within a central passageway 24 in the coupling element 3. The trunnions 19 are formed by the projecting portions of a pin 25 secured in an aperture 26 extending through the boss portion between the flat faces 23. Each of the bearers 20 is rectangular in plan with parallel opposite side faces and has an inner flat face 27 abutting the adjacent flat face 23 of the boss portion. The face 28 of each bearer opposite its face 27 bears against the bottom surface of the associated guideway 21 and is cylindrically curved so that the shaft 2 can rock with respect to the coupling element 3 about an axis at right angles to the common axis of the trunnions 19. The length of the trunnions 19 are such that these trunnions do not interfere with the line of curvature of the faces 28.

If desired, the trunnions 11, 12 and 19 may be pivotally mounted in their associated parts by means of needle bearings.

The shafts 1 and 2 are coupled together by a ball and socket joint 29 disposed between the ends of axial extensions 30, 31 from the adjacent ends of the shafts. The socket 32 of the joint is formed in the end of the extension 30 of the shaft 2, whilst the ball 33 is formed on the end of the extension 31 which has a cylindrical end portion 34 remote from the joint 29 slidable in a cylindrical passageway 35 coaxial with the shaft 1 and which projects through the opening 10 in the hub 9 where it is pivotally supported on the pin 14 so that the cross 8 can rock relative to the extension about the axis of the trunnions 11. The extension 31 is pivoted on the pin 14 by the latter passing through an aperture 36 formed through a boss portion 37 of the extension and this boss portion has flat faces 38 abutting opposite sides of the opening 10.

The ball 33 of the joint 29 is only part-spherically-shaped, being formed with flat faces 33a on opposite sides thereof and a flat end face 33b. The socket 32 consists of a transverse slot in the end of the axial extension 30, this slot having opposed spherically-shaped recesses in its parallel sides 32a. The slot is wide enough to enable the ball to pass into the slot when the ball is turned so that its flat faces 33a are parallel to the slot sides 32a, i.e. parallel to the axis of the slot, and having inserted the ball into the slot, it is turned through 90° to engage its spherically-shaped surfaces with the correspondingly-shaped recesses in the sides 32a, thereby assembling the ball joint. The faces 33a of the ball are approximately perpendicular to the axis of the aperture 36 of the extension 31 and the planes of the slots sides 32a are approximately perpendicular to the axis of the pin 25 so that, when the pin 14 is passed through the aperture 36, the ball is locked in its assembled position.

The distances between the centre of the ball 33 and the axes about which the shafts 1 and 2 rock relative to the central coupling element 3 are equal and, therefore, it will be apparent that the universal joint described above is a constant velocity universal joint, the output shaft rotating at the same instantaneous speed as the input shaft irrespective of the angular inclination of the axes of the shafts within the operating limits of the joint. It will also be apparent that the input shaft 1 can slide relative to the cross 8 and ball 33 in the direction of its axis of rotation so as to compensate for variations in the length of a transmission system in which the universal joint is incorporated.

The approximately constant velocity universal joint illustrated in FIGURE 4 comprises input and output shafts 41, 42 coupled to a central coupling element 43 by two Cardan joints 44, 45 and having their adjacent ends also coupled together by a ball and socket joint 46. The Cardan joint 44 is slidable relative to the shaft 41 and is of the same construction as the Cardan joint 4 shown in FIGURES 1, 2 and 3. Also, as in the previous embodiment, the ball 47 of the ball joint 46 is provided at the end of an axial extension 48 having an end portion 49 remote from the ball joint 46 slidable in an axial passageway 50 in the shaft 41 and pivotally supported intermediate its ends on a pin 51 which forms the trunnions of the cross 52 which are pivoted in the sliding bearers 53.

The cross 54 of the Cardan joint 45 is of the same construction as the cross 52, but in this case the trunnions 55, which are constituted by the projecting portions of the pin 56 extending completely through the hub of the cross, are pivoted in needle bearings 57 mounted in aligned bearing apertures 58 in the output fork 59 at the end of the output shaft 42 so that the Cardan joint 45 is not slidable with respect to the shaft 42. However, similarly to the ball 47, the socket 60 of the ball and socket joint 46 is formed in the end of an axial extension 61 which has an end portion 62 remote from the joint 46 engaged in an axial passageway 63 in the adjacent end of the shaft 42 and which projects through the opening 64 in the centre of the cross 54 and is pivotally supported on the pin 56.

Since the crosses 52, 54 are pivoted at fixed positions on the central coupling element 43, the socket 60 is of cylindrical configuration in order to allow for relative sliding movement between the ball and the socket. The centre of the ball 47 is only at equal distances from the axes of both the pins 51 and 56 at a predetermined angular inclination of the axes of the input and output shafts 41, 42 so that truly constant velocity transmission is only achieved when the axes of the shafts are at that angular inclination.

The constant velocity universal joint shown in FIGURE 5 illustrates a modified construction of the cross 70 coupling the fork 71 of the input shaft 72 to the central coupling element 73. As distinguished from the joint shown in FIGURES 1, 2 and 3, the cross 70 is not slidable with respect to the fork 71. It includes a hub member 74 having a central opening 75 and trunnions 76 pivotally mounted respectively in needle bearings 77 in aligned apertures 78 in the fork 71. The trunnions 76 are formed by the projecting portions of sleeve members secured in apertures in the hub member on opposite sides of the opening 75 so that their axial passageways 79 connect with said opening and are mutually aligned.

The axial extension 80 from the end of the shaft 72 and which carries the ball 81 of the ball and socket joint 82 is supported intermediate its ends in the opening 75 by means of a pin 83 extending across the opening and having opposite end portions mounted respectively in the axial passageways 79 of the sleeve members or trunnions 76. The pin 83 is retained in position by circlips 84 engaged in annular grooves in the walls of the axial passageways 79 at opposite ends of the pin.

Whilst particular embodiments have been described, it will be understood that various modifications can be made without departing from the scope of the invention. For example, in order to strengthen the socket 32 of the ball and socket joint 29, the two side walls of the slot may be connected together by top and bottom walls so as to form a cavity in which the ball fits.

I claim:
1. In a universal joint of the double Cardan type wherein a first Cardan joint couples an input member to a central coupling element and the second Cardan joint couples an output member to said central coupling element, and wherein at least one of the Cardan joints includes a cross member coupling the associated one of said input and output members to the central coupling element, said cross having an opening in the centre thereof and two pairs of trunnions perpendicular to one another and pivoted respectively to a fork at the adjacent end of said associated member and said central coupling element, and said input and output members are also coupled together by a ball and socket joint between the ends of axial extensions from the adjacent ends of the input and output members, the improvement consisting in that the axial extension disposed within said fork is supported, intermediate its ends, in said opening in said cross by means which allows the cross to rock relative to said extension about the axis of the trunnions which are pivoted to said fork.

2. A universal joint as claimed in claim 1, wherein the pair of trunnions pivoting the cross of said at least one Cardan joint to said fork are also slidably mounted in the fork so as to enable the cross to move relative to the associated one of said input and output members in the direction of its axis of rotation, and wherein the axial extension supported by the cross has an end portion remote from the ball and socket joint arranged to slide in a passageway in the said associated member.

3. A universal joint as claimed in claim 2, wherein the pair of trunnions pivoting the cross to said fork are pivotally mounted respectively in bearers slidable in opposed guideways in the said fork.

4. A universal joint as claimed in claim 1, wherein the cross of said at least one Cardan joint includes a hub with the opening therein and the pair of the trunnions pivoting the cross to the said fork are constituted by a pin secured in the hub and extending across the opening, the axial extension being pivotally supported on said pin in said opening.

5. A universal joint as claimed in claim 1, wherein the cross of said at least one Cardan joint includes a hub with the opening therein and the pair of trunnions pivoting the cross to the said fork are constituted by a pair of aligned sleeve members projecting from opposite sides of the hub, the axial extension being supported in the opening by means of a pin located in said sleeve members and extending across said opening.

6. A universal joint as claimed in claim 1, wherein the other Cardan joint comprises a pair of trunnions pivotally mounted in bearers slidable respectively in a pair of opposed guideways in the central coupling element, the axis of said trunnions lying in the same plane as the axis of the trunnions of the cross of said at least one Cardan joint pivoting the cross to the said fork and said bearers being shaped to permit the associated one of said output and input members to rock relative to the central coupling element about an axis perpendicular to said plane.

7. A universal joint as claimed in claim 1, wherein each Cardan joint comprises a cross member and the axial extension within the fork of each Cardan joint is supported intermediate its ends in an opening in the centre of the associated cross by means which allows the cross to rock relative to said extension about the axis of the trunnions of the cross which are pivoted to said fork, and wherein each cross has one pair of trunnions pivoted to the central coupling element and the ball and socket joint is extensible.

8. A universal joint as claimed in claim 1, wherein the ball and socket joint comprises a ball of part-spherical shape having a pair of opposite flat faces and the socket consists of a transverse slot in the end of its associated axial extension, which slot has opposed spherically-shaped recesses formed repectively in its opposite sides and is wide enough to enable the ball to pass into the slot when the ball is turned so that its flat faces are parallel to th axis of the slot, said ball being able to be turned, upon insertion into the slot, to engage its spherically-shaped surfaces with said recesses.

9. A universal joint as claimed in claim 8, wherein the two side walls of the slot are connected together by top and bottom walls so as to form a cavity in which the ball fits.

References Cited by the Examiner

UNITED STATES PATENTS

| | | | |
|---|---|---|---|
| 2,067,286 | 1/1937 | Pearce | 64—21 |
| 2,255,762 | 9/1941 | Dodge | 64—21 |
| 2,329,903 | 9/1943 | Horne | 64—21 |

FOREIGN PATENTS 920,877  1/1947  France.

FRED C. MATTERN, Jr., *Primary Examiner.*

HALL C. COE, *Examiner.*